US 6,724,861 B2

(12) United States Patent
Newland et al.

(10) Patent No.: US 6,724,861 B2
(45) Date of Patent: Apr. 20, 2004

(54) METHOD AND APPARATUS FOR DISSEMINATING EMERGENCY WARNING INFORMATION

(76) Inventors: David Newland, 3729 Snowcreek, Aledo, TX (US) 76008; Bobby W. Newland, 708 Highland Dr., Marble Falls, TX (US) 78654

( * ) Notice: Subject to any disclaimer, the term of this patent is extended or adjusted under 35 U.S.C. 154(b) by 182 days.

(21) Appl. No.: 09/966,192

(22) Filed: Sep. 28, 2001

(65) Prior Publication Data

US 2002/0039405 A1 Apr. 4, 2002

Related U.S. Application Data

(60) Provisional application No. 60/237,128, filed on Oct. 3, 2000.

(51) Int. Cl.[7] .............................................. H04M 11/04
(52) U.S. Cl. ...................... 379/49; 379/48; 379/211.04; 340/601
(58) Field of Search ........................ 379/37–51, 110.01, 379/90.01, 211.02–211.04; 340/601; 455/404

(56) References Cited

U.S. PATENT DOCUMENTS

| 5,278,539 A | | 1/1994 | Lauterbach et al. | |
| 5,541,980 A | | 7/1996 | Urewicz | |
| 5,949,851 A | | 9/1999 | Mahaffey | |
| 6,002,748 A | * | 12/1999 | Leichner | 379/48 |
| 6,021,177 A | * | 2/2000 | Allport | 379/48 |
| 2003/0095639 A1 | * | 5/2003 | Vinson | 379/37 |

\* cited by examiner

Primary Examiner—Wing Chan
(74) Attorney, Agent, or Firm—Schultz & Associates, P.C.

(57) ABSTRACT

A method and apparatus for disseminating emergency warning information via a telecommunication network via a telecommunication network is disclosed. After a Local Emergency Planning Committee (LEPC) has decided to issue a warning regarding an impending emergency to a specific area, the LEPC dials a group emergency telephone number to issue a warning to any subscriber of the group emergency telephone number. The warning, which may be audio and/or visual, informs the subscriber of the impending emergency and/or the necessary actions that needs to be taken by the subscriber. By sending the warning via a telecommunication network, a large number of people can be contacted with specific details of the impending emergency within a short period of time.

17 Claims, 3 Drawing Sheets

METHOD AND APPARATUS FOR DISSEMINATING EMERGENCY WARNING INFORMATION

RELATED PATENT APPLICATION

The present patent application claims priority to a copending provisional application U.S. Ser. No. 60/237,128, filed on Oct. 3, 2000.

BACKGROUND OF THE INVENTION

1. Technical Field

The present invention relates to a method and apparatus for disseminating information in general, and in particular to a method and apparatus for disseminating emergency information. Still more particularly, the present invention relates to a method and apparatus for disseminating emergency warning information via a telecommunication network.

2. Description of the Related Art

Information regarding current emergencies and impending disasters are commonly disseminated by a national agency, such as the National Weather Bureau or other installations, to a Local Emergency Planning Committee (LEPC) via an alarm. After receiving the alarm, the LEPC, which is typically operated by a 911 emergency type facility such as a police station, in turn issues an emergency warning by sirens located throughout the local communities to which the LEPC belongs.

Although the sound of sirens can easily reach many people within a large area, some people may be working at a location where the sound of sirens cannot be heard. In addition, because the sirens give little information about the type of emergency, the warning is often supplemented with radio and television announcements; however, some people may be living or working in an area where access to radios or televisions are not possible.

Many methods have been employed in an attempt to resolve the above-mentioned problems. But those methods have been proven ineffective because they either require purchases of expensive equipment by users or they cannot be easily implemented. Thus, there is a need for an improved emergency warning broadcasting system that is capable of reaching a large number of people within a short period of time. Such emergency warning broadcasting system must be easy to implement and economical to maintain. Also, such emergency warning broadcasting system should not require a user to purchase any additional equipment.

SUMMARY OF THE INVENTION

In accordance with a preferred embodiment of the present invention, emergency warning information is disseminated via a telecommunication network. After a Local Emergency Planning Committee (LEPC) has decided to issue a warning to a specific area regarding an impending emergency, the LEPC dials a group emergency telephone number and issues a warning to any subscriber of the group emergency telephone number. The warning, which may be audio and/or visual, informs the subscriber of the impending emergency and/or any action that needs to be taken by the subscriber. By sending the warning via a telecommunication network, a large number of subscribers can be informed of the specific details of the impending emergency within a short period of time.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
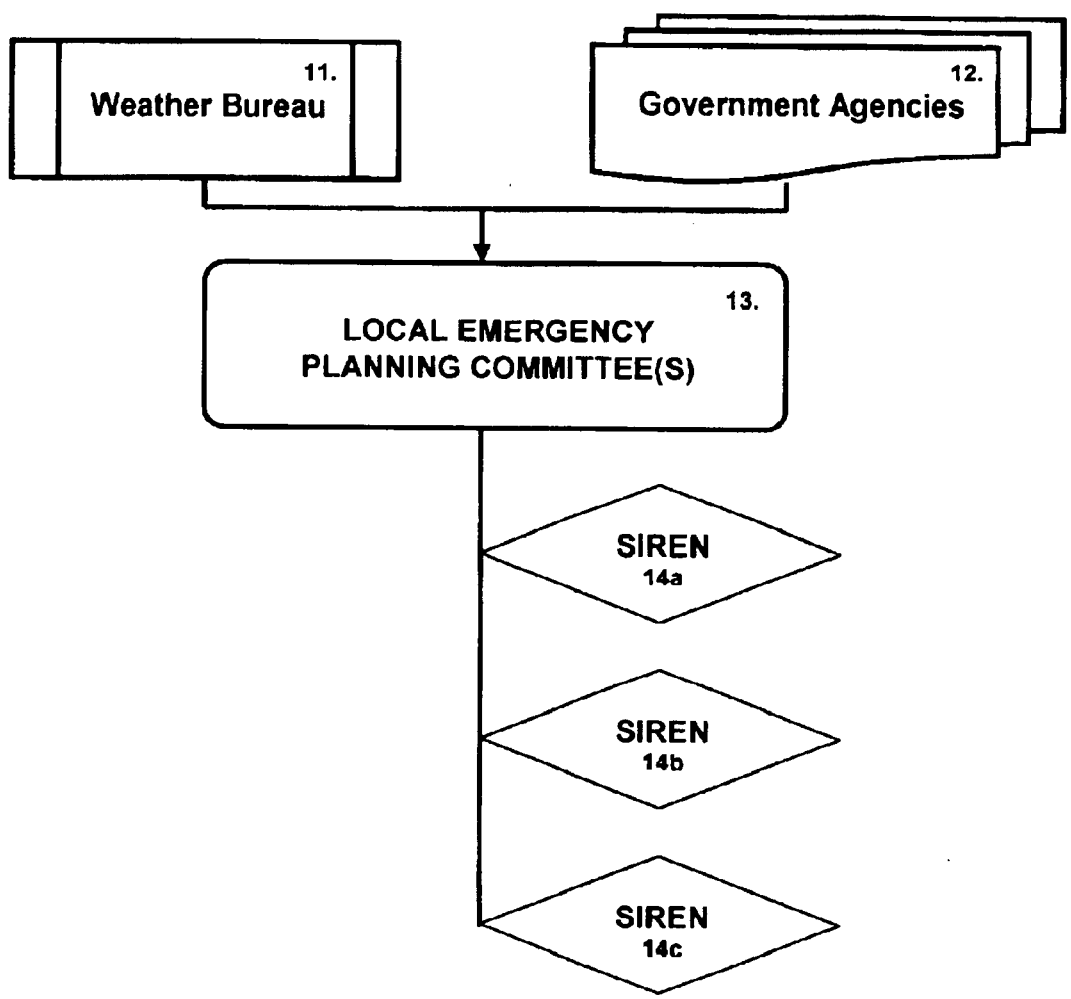
FIG. 1 is a block diagram of an emergency warning broadcasting system, according to the prior art.

With reference now to the figures, and in particular to FIG. 1, there is depicted a block diagram of an emergency warning broadcasting system, according to the prior art. When an impending emergency, such as a tornado, is developing, an originating bureau, such as a weather bureau 11 or a governmental agency 12, notifies a Local Emergency Planning Committee (LEPC) 13 the occurrence of the impending emergency. Based on the type of the impending emergency and the area affected by the impending emergency, LEPC 13 issues an emergency warning to the local communities to which LEPC 13 belongs by activating one or more sirens, such as sirens 14a–14c, located within the respective communities. Because sirens 14a–14c provide little information as to the nature of the impending emergency itself, the warning dispensed by sirens 14a–14c has to be typically supplemented with radio and television announcements. If a person can not get to a radio or television, or simply does not have one, then all he/she knows is that there is an impending emergency going on but not knowing what the exact nature of the impending emergency is. Worse yet, some people may be working at a location where the sound of sirens 14a–14c cannot be heard. Then, those people would not even be aware of the impending emergency.

In accordance with a preferred embodiment of the present invention, a unique group emergency telephone number is assigned to each postal zip code (or zip code+4) within the United States of America. Such assignment can be preformed by a national or regional telephone company, such Southwestern Bell, QWest, BellSouth, etc. Each of the group emergency telephone numbers is programmed into a computer to be associated with a respective zip code. Any person who has a communication device can subscribe to an emergency warning service. A communication device is any device that can be assigned a telephone number and are capable of receiving audio and/or visual information from a remote transmission source. Examples of communication devices include, but are not limited to, cord telephones, cordless telephones, mobile telephones, pagers, etc. During the signing up of the emergency warning service, the subscriber, or specifically the communication device of the subscriber, is assigned a group emergency telephone number based on the zip code given by the subscriber. The group emergency telephone number is assigned in addition to a standard telephone number of the communication device of the subscriber.

Preferably, the issuance of a group emergency number is based on the zip code to which a communication device is registered. For a non-mobile communication device, the location of the communication device determines what zip code the communication device will be registered in. For a mobile communication device, the subscriber may select what zip code the communication device should be register in, or the registration may be based on the zip code at which the communication device was purchased.

After a group emergency number has been assigned to the communication device of the subscriber, any further emergency warning can be communicated to the subscriber via the group emergency telephone number. In fact, by dialing a single group emergency telephone number, any subscriber who has an identical group emergency telephone number can be simultaneously reached via their communication device. The method of dialing a single telephone number to access many different telephones simultaneously is well-known in the art.

Figure 2:
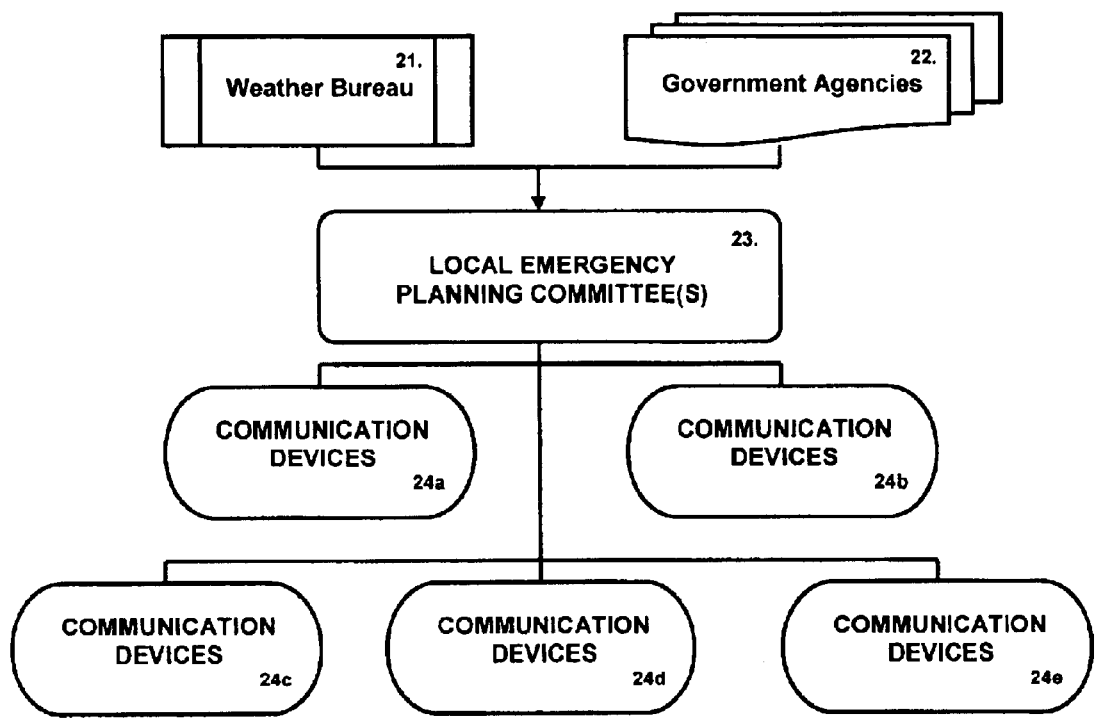
FIG. 2 is a block diagram of an emergency warning broadcasting system, in accordance with a preferred embodiment of the present invention.

With reference now to FIG. 2, there is depicted a block diagram of an emergency warning broadcasting system, in accordance with a preferred embodiment of the present invention. When an impending emergency is developing, an originating bureau, such as a weather bureau 21 or a governmental agency 22, notifies an LEPC 23 the occurrence of the impending emergency. The impending emergency can be any situation that could cause harm to the public. Examples of impending emergency include hazardous weather conditions, prison escapes, fires, bomb threats, air raid, etc. Based on the type of the impending emergency and the area affected by impending emergency, LEPC 23 determines what area or areas of a community or communities should be issued a public emergency warning. After the proper zip codes of the determined areas have been located, LEPC 23 dials (or calls) a group emergency telephone number to simultaneously broadcast the impending emergency to subscribers to the group emergency telephone number. Each group emergency telephone number corresponds to a postal zip code. Generally speaking, each subscriber of the same postal zip code has a communication device, such as one of communication devices 24a–24c, and each subscriber of a group emergency telephone number can be simultaneously informed of the impending emergency via the group emergency telephone number.

If the communication device is in-use when the LEPC is attempting to reach the subscriber of the emergency warning service, the LEPC will send low-level "voice-over" signal to the subscriber that there is an incoming call. At this point, the subscriber can interrupt the on-going communication and switch to the incoming call to establish a second connection. After above-mentioned second connection has been established, the subscriber is informed of the impending emergency and any proper action that needs to be taken.

Figure 3:
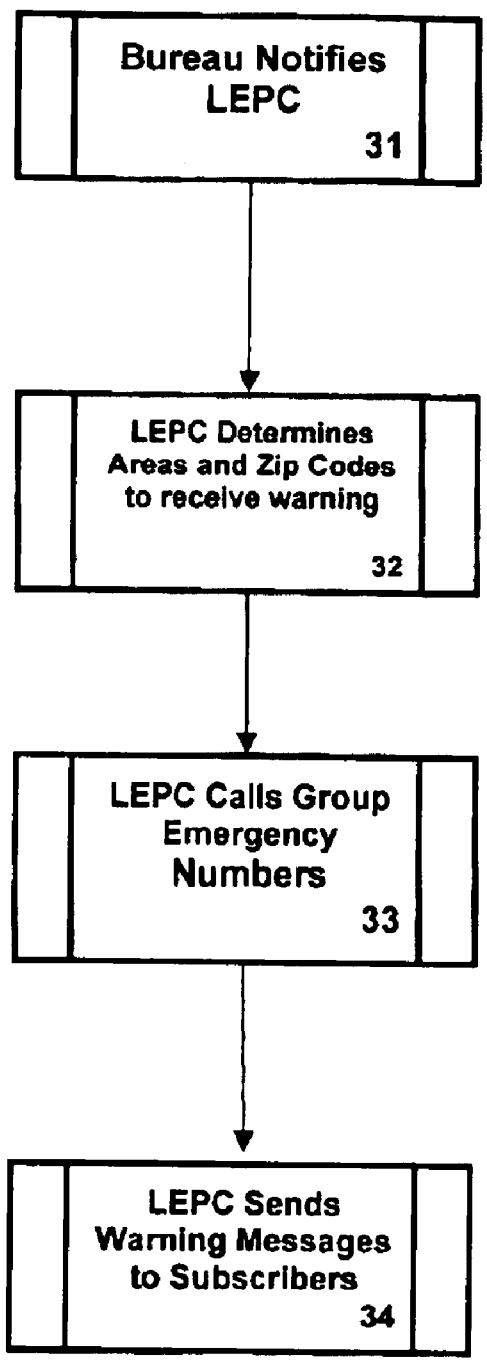
FIG. 3 is a high-level flow diagram of a method for disseminating emergency warning information, in accordance with a preferred embodiment of the present invention.

Referring now to FIG. 3, there is depicted a high-level flow diagram of a method for disseminating emergency warning information, in accordance with a preferred embodiment of the present invention. In response to an impending emergency, an originating bureau notifies an LEPC of the occurrence of the impending emergency, as shown in block 31. The LEPC then determines what areas need to receive a warning regarding the impending emergency, as depicted in block 32. In addition to the LEPC, the originating bureau may also determine what areas need to receive a warning about the impending emergency. After obtaining the respective zip codes of the areas that have been determined to receive the warning, the LEPC then automatically calls one or more group emergency telephone numbers, preferably via a computer, each of the group emergency telephone numbers corresponds to one of the above-determined zip codes, as shown in block 33. After a subscriber has answered the group emergency telephone call from the LEPC computer, the LEPC computer sends a warning message informing the subscriber of the impending emergency and any proper action that the subscriber needs to take, as depicted in block 34. The warning message can be audio and/or visual.

As has been described, the present invention provides an improved method for disseminating emergency warning information via a telecommunication network. With the present invention, any person who has subscribed to a group emergency telephone number service will receive an emergency warning when there is an occurrence of an impending emergency. By issuing the warning via a telecommunication network, a large number of people would be informed about the impending emergency within a short period of time. The emergency warning broadcasting system of present invention is also easy to implement, economical to maintain and does not require a user to purchase any additional equipment.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for disseminating emergency warning information, said method comprising:

assigning a plurality of group emergency telephone numbers to a plurality of predefined geographical locations;

in response to an impending emergency, determining which one or more of said plurality of predefined geographical locations need to be informed of said impending emergency; and calling one or more of said group emergency telephone numbers based on said one or more of said plurality of predefined geographical locations to simultaneously inform subscribers of said group emergency telephone numbers about said impending emergency via a warning message on a communication device.

2. The method of claim 1, wherein said predetermined area is defined by a postal zip code.

3. The method of claim 1, wherein each of said group emergency telephone numbers corresponds to one of said predefined geographical locations.

4. The method of claim 1, wherein said warning message is audio.

5. The method of claim 1, wherein said warning message is visual.

6. The method of claim 1, wherein said communication device is a telephone.

7. A computer program product residing on a computer usable medium for efficiently disseminating emergency warning information, said computer program product comprising:

program code means for assigning a plurality of group emergency telephone numbers to a plurality of predefined geographical locations;

program code means, in response to an impending emergency, for determining which one or more of said plurality of predefined geographical locations need to be informed of said impending emergency; and program code means for calling one or more of said group emergency telephone numbers based on said one or more of said plurality of predefined geographical locations to simultaneously inform subscribers of said group emergency telephone numbers about said impending emergency via a warning message on a communication device.

8. The computer program product of claim 7, wherein said predetermined area is defined by a postal zip code.

9. The computer program product of claim 7, wherein each of said group emergency telephone numbers corresponds to one of said predefined geographical locations.

10. The computer program product of claim 7, wherein said warning message is audio.

11. The computer program product of claim 7, wherein said warning message is visual.

12. The computer program product of claim 7, wherein said communication device is a telephone.

13. A computer system for disseminating emergency warning information, said computer system comprising:

means for determining which one or more of said plurality of predefined geographical locations need to be informed of an impending emergency, in response to said impending emergency; and means for calling at least one group emergency telephone number to simultaneously inform subscribers of said at least one group emergency telephone number about said impending emergency via a warning message, wherein said at least one group emergency telephone number is assigned to a predefined geographical location.

14. The computer system of claim 13, wherein said predetermined area is defined by a postal zip code.

15. The computer system of claim 13, wherein said warning message is audio.

16. The computer system of claim 13, wherein said warning message is visual.

17. The computer system of claim 13, wherein said communication device is a telephone.

* * * * *